United States Patent

[11] 3,561,739

| [72] | Inventors | Heinz Kuehne<br>Oberhoeschstadt, Taunus;<br>Manfred Dietze, Offenbach am Main;<br>Franz Hauer, Frankfurt am Main,<br>Germany |
|---|---|---|
| [21] | Appl. No. | 758,496 |
| [22] | Filed | Sept. 9, 1968 |
| [45] | Patented | Feb. 9, 1971 |
| [73] | Assignee | Vickers-Zimmer Aktiengesellschaft<br>Planung und Bau von Industrieanlagen |

[54] SCREW CONVEYOR
11 Claims, 16 Drawing Figs.

[52] U.S. Cl.................................................. 263/7,
198/213
[51] Int. Cl...................................................... F27b 9/16,
B65h 5/08
[50] Field of Search........................................ 198/213,
64; 222/(No search suggested); 103/117M; 230/120HS;
18/125F, 18.2ES; 415/72; 263/7

[56] References Cited
UNITED STATES PATENTS
2,805,627  9/1957  Bendett....................  415/72
FOREIGN PATENTS
1,249,645  11/1960  France......................  198/213
425,447  4/1935  Great Britain.............  103/117M Primary Examiner—Richard E. Aegerter
Attorney—Molinare, Allegretti, Newitt & Witcoff ABSTRACT: A screw conveyor for viscous material which includes a screw and a housing. The screw is made of a constant diametered shaft and a helical spiral web attached to the shaft surface. The housing includes an inlet region, a draw-in region and a constant diametered pressure region. The inlet region has a cross-sectional area larger than that of the pressure region, and the draw-in region connects those two regions. The web on the shaft of the screw has a constant width in the pressure region, but a greater width in the draw-in region. The configuration of the housing and web in at least a portion of the draw-in region combine to cause the edge of the web to come close to the wall of the housing during parts of a revolution of the screw and to leave a gap between the housing and the screw during other parts of the revolution.

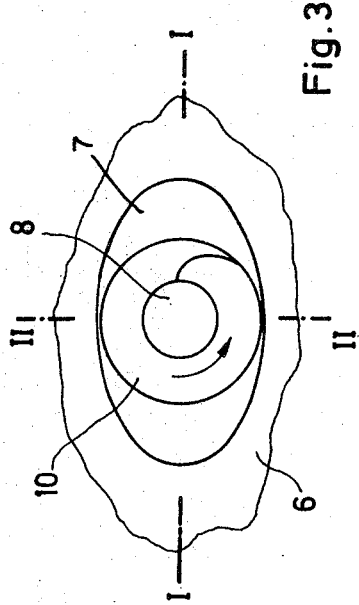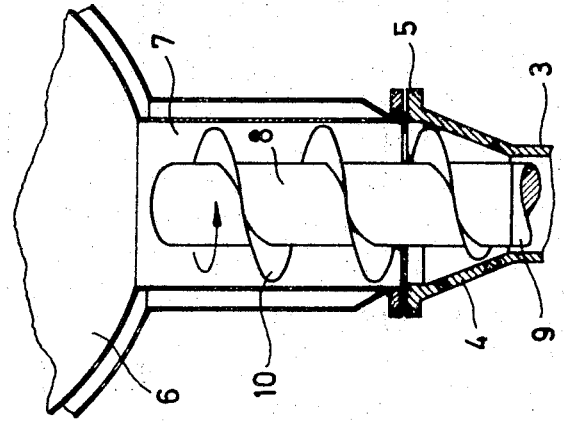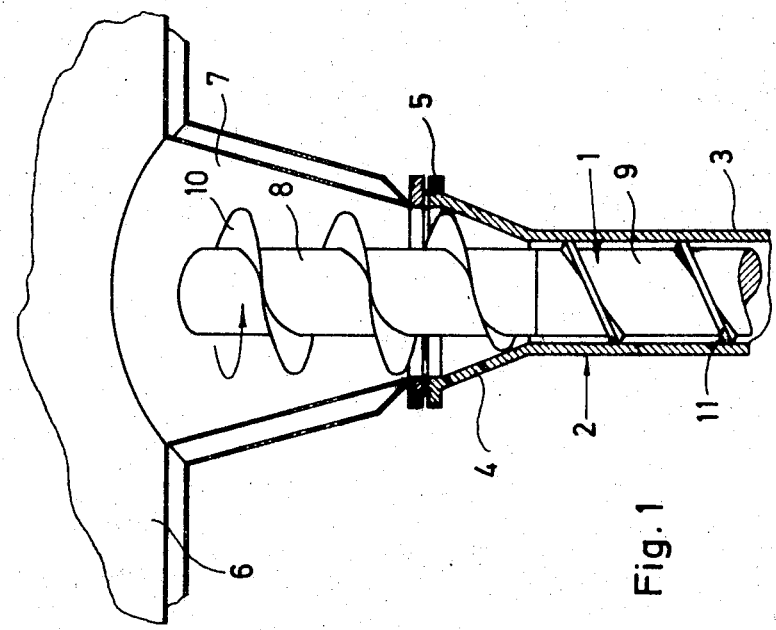
INVENTORS
HEINZ KUEHNE,
DR. MANFRED DIETZE
& FRANZ HAUER
BY
Bair, Freeman & Molinare
Attys.

INVENTORS
HEINZ KUEHNE,
DR. MANFRED DIETZE
& FRANZ HAUER
BY
Molinare, Allegretti, Newitt & Witcoff
Attys.

INVENTORS
HEINZ KUEHNE,
DR. MANFRED DIETZE
& FRANZ HAUER
BY Bair, Freeman & Molinare
Attys.

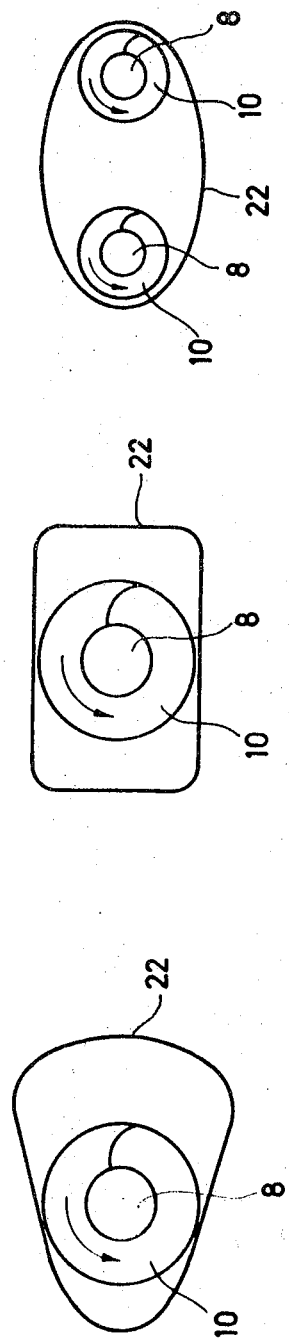
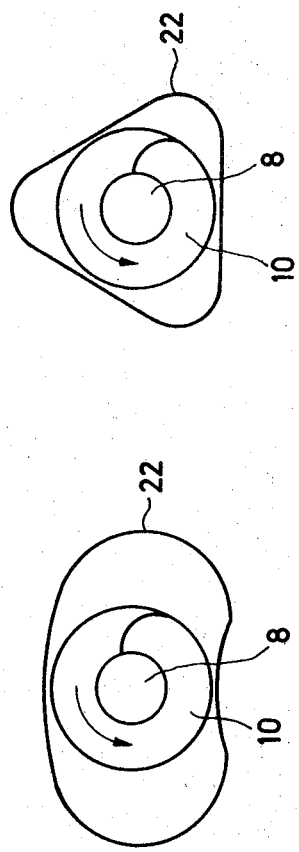

SCREW CONVEYOR

BACKGROUND OF THE INVENTION

This invention relates to a screw conveyor. More particularly the invention relates to a screw conveyor for conveying highly viscous media, having one or more screws with one or more spirals in a casing with a widened inlet.

Prior art screw conveyors for conveying highly viscous media essentially comprise a screw surrounded by a casing with a widened inlet part and an outlet part of constant diameter along its whole length (see U.S. Pat. No. 2,805,627). In the prior art device, the screw webs or flights are adapted to the configuration of the internal wall of the casing, and the screw core is conical in the drawin region of the screw. The apparatus is connected in a vertical position under a reservoir filled with the medium to be discharged. The apparatus can also comprise a wing screw so that the medium can be drawn in more easily. It has been found in practice that, in such known screw conveyor, particularly when highly viscous melts are being discharged from a vacuum container, a considerable amount of melt can flow back and interrupt the flow of material. The apparatus cannot, therefore, be used for media having a dynamic viscosity of approximately 2500 poises or more. Experiments have shown that the flow of material is most likely to be broken when the reservoirs in contact with the screw are run dry or when air or vapor bubbles are formed inside the drawin region, i.e. by leaks in the flange between the reservoir and the screw conveyor or by vaporized reaction products. In the first case, it has been found that even if the reservoir is refilled with melt while the conveyor is operating, no more material is conveyed through the apparatus and the screw spirals remain empty. To remedy the situation, the conveyor has to be turned off first, then the melt slowly flows through and the apparatus can be started up again. In the second case, it has been observed that the vapor or air bubbles do not escape upwards through the melt, but are more inclined to form a larger vapor or air cushion inside the drawin zone, which will eventually interrupt the flow of material.

The object of the present invention is to provide a screw conveyor of the aforementioned type, in which there is no interruption in the flow of material in the drawin region, even if the reservoir is run empty or if air or vapor bubbles are formed in the medium being conveyed.

SUMMARY OF THE INVENTION

The device according to the invention is characterized by a drawin region having a gap, extending from the inlet opening over at least part of the region, between the edge of the web on each screw and the casing on at least one side of the screw. This ensures that sufficient melt is conveyed to the conveyor outlet and that any air or vapor bubbles can escape upwards from the drawin region into the reservoir. In a screw casing of the aforementioned type, the screw webs exert an alternating effect on the medium. At each rotation of the screw, the medium is alternately compressed one or more times, depending on the number of gaps, by a screw spiral and conveyed forward towards the outlet screw, after which it is released and allowed partly or completely to expand. The medium is thus alternately conveyed into the outlet part of the screw, associated with compression, and released, associated with expansion. The expansion allows gas bubbles to escape, as they chiefly form in the gap. In a screw conveyor which, particularly in the vertical position, is used for continuously removing highly viscous polymer melts from vacuum reservoirs, it is advantageous for the gaps to have a crescent cross section. This avoids blind corners where parts of the melt may stick.

The size of the gap depends on the medium being processed. If the medium is very highly viscous, the gap should be reduced so as to increase the conveying power of the drawin screw. Care should be taken that the gap is not too small, so that the medium can flow sideways into the spirals of the drawin screw. If a large number of gas bubbles form in the medium, the gap is made larger so that the bubbles can escape more easily. Escape of bubbles is facilitated and the conveying power is increased if the gap continuously increases towards the inlet aperture.

Advantageously, the gap is formed by a widening of the casing and/or a decrease in the width of the screw webs. The apparatus according to the invention can, for example, be designed so that the inlet part has one or more convex portions projecting higher than the webs. Alternatively, if the apparatus is vertical and the webs are underneath one another, the webs can be uniformly or stepwise reduced in size on one or more sides of the screw in the drawin zone. The two methods can also be combined. The conveying effect is improved if the part of the screw in the drawin region has a greater depth of spiral than the part in the discharge region.

If the screw conveyor has a number of gaps, the gaps may advantageously by symmetrical with respect to one another. In a particularly advantageous embodiment, two gaps are arranged opposite one another, so that the drawin zone has oval or elliptical cross sections.

The screw part in the drawin region can be combined to form a unit with the part in the discharge region. The screw cores can have the same diameter. For special purposes, it is advantageous for the screw part in the drawin region to extend into the reservoir. In the case of a number of highly viscous media, it is an advantage for the apparatus to be heated in known manner.

BRIEF DESCRIPTION OF THE DRAWINGS AND OF THE PREFERRED EMBODIMENTS

The invention will now be described in detail with reference to a number of examples.

In the drawings:

FIG. 1 is a longitudinal section view, taken along line 1–1 in FIG. 3, through the drawin region of a screw conveyor of the invention;

FIG. 2 is a longitudinal section view, taken along line II–II in FIG. 3, through the drawin region;

FIG. 3 is a plan view of the apparatus in FIGS. 1 and 2;

FIGS. 12 to 16 show the section views of a number of other drawin zones.

Figure 4:
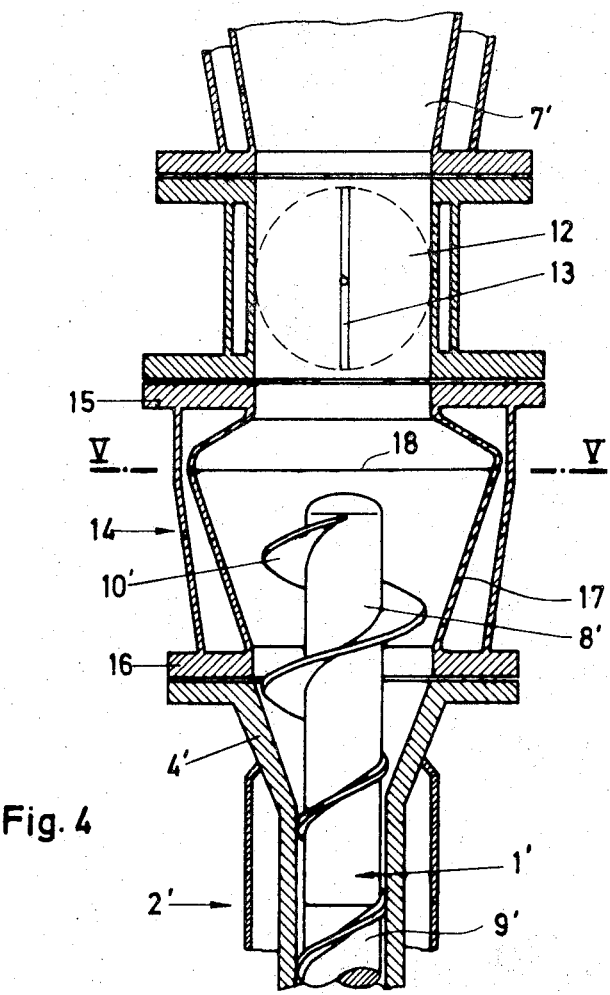
FIG. 4 is a longitudinal section view through a drawin region of a heated screw conveyor according to the invention.

The screw conveyor in FIGS. 1 to 3 especially comprises a screw 1 and a screw-housing 2 which comprises an outlet portion 3 and a widened inlet portion 4. The apparatus is fastened by means of a flange 5 to an outlet nozzle 7 at the bottom of a reservoir 6. Outlet nozzle 7 together with inlet portion 4, which contains the extended part 8 of screw 1, forms the drawin zone of the screw conveyor. The connecting flange 5, can, of course, be disposed directly below reservoir 6, in which the drawin region is formed by the widened inlet portion 4 and screw part 8 alone. In practice, however, the embodiment shown is found to be preferable.

Screw part 8 has the same core diameter as the screw part 9 in the discharge region, which begins below the inlet portion 4. The core of part 8 can be removably connected to the screw part 9 in the discharge region. The webs 10 in the drawin region are wider than webs 11 in the discharge region. The lower webs in the drawin region extend as far as the conical inner surface of inlet portion 4. The remaining webs in the drawin region which have a substantially uniform width extend to the end of part 8. In the present embodiment, the webs 10 of part 8 have a greater angle of inclination than webs 11 in the discharge screw 9. It should be noted that, in each embodiment of the conveyor according to the invention, the inclination of webs 10 and their widths depend on the medium being discharged from container 6, and they are constructed so as to achieve the most efficient discharge.

Outlet nozzle 7 has an approximately elliptical cross section, and is most elliptical in the part immediately adjoining the reservoir 6. The cross section becomes increasingly round towards flange 5, and is circular at flange 5. On the other hand, inlet part 4 is frustoconical in shape and it widens conically in all directions. The nozzle 7 of reservoir 6 essentially only widens conically in two directions. FIG. 1 shows the conical widening of nozzle 7, whereas, in the section view in FIG. 2, the opposite wall parts of nozzle 7 are parallel. FIG. 3 clearly shows the elliptical shape of nozzle 7 at the bottom of the reservoir. In this embodiment, the casing of the drawin region is shaped like a truncated pyramid upside down, with an elliptical base and a circular top. Reservoir 6 and outlet nozzle 7 have double walls. The space between the walls is filled with a heating medium.

Figure 5:
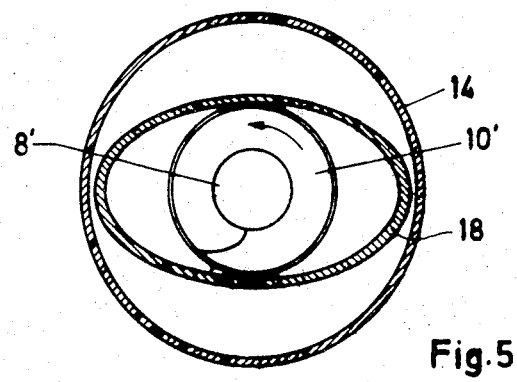
FIG. 5 is a section view of the apparatus in FIG. 4, along line V–V.

FIGS. 4 and 5 show a drawin region of another embodiment. A length of tube 12 with a shutoff valve 13 is disposed between the outlet nozzle 7' of reservoir 6' (not shown) and the screw conveyor. The conveyor comprises an intermediate section 14 having flanges 15 and 16 at its two ends. Section 14 is connected by flanges 15 and 16 to tubular section 12 and the widened inlet part 4' of casing 2'. Section 14 has double walls, like all other parts of the conveyor and section 12 and outlet nozzle 7', so that all parts can be heated by a fluid or vapor. All the inner and outer walls of the parts shown are of circular cross section except the inner wall 17 of section 14, which has a circular cross section at flanges 15 and 16 but becomes elliptical at the connecting seam 18. In this embodiment, seam 18 is above the upper end of the screw. As in the previous embodiment, screw part 8' has a core with the same diameter as part 9' in the discharge region, and comprises wider webs 10'.

Figure 6:
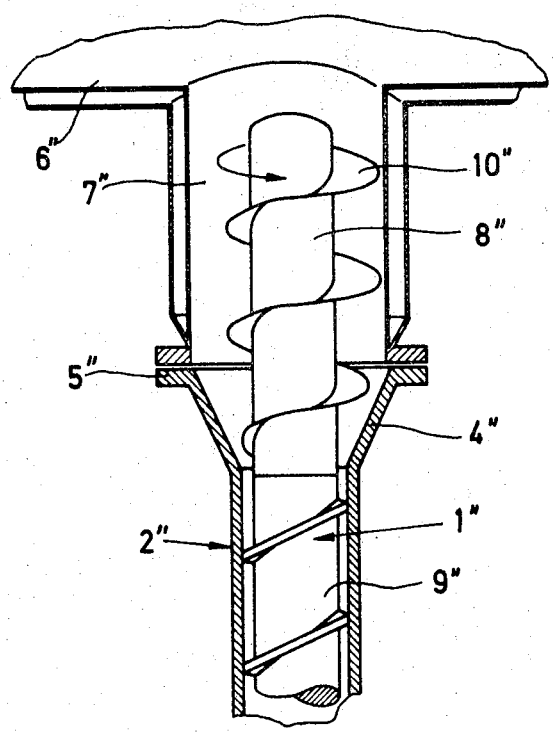
FIG. 6 is a longitudinal section view of another embodiment of a drawin region in which the webs are reduced in size on one side of the screw.
Figure 7:
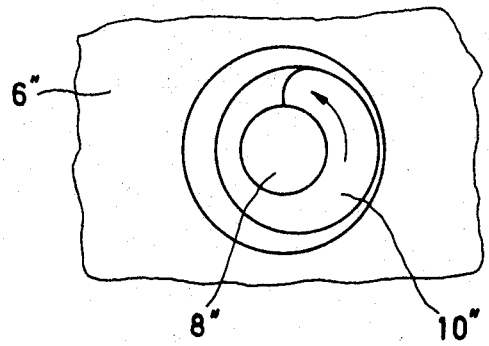
FIG. 7 is a plan view of the apparatus in FIG. 6.

FIGS. 6 and 7 show an embodiment of the drawin region in which the widened inlet portion 4" and the outlet nozzle 7" of reservoir 6" are round in cross section. The gap between webs 10" and the inner wall of the drawin region is made by reducing the width of the screw flight. This gap is necessary for ventilation and for efficient drawing in of the medium. Screw flights or webs 10" are flattened on one side of screw 8" around approximately half its circumference. In this embodiment, the flattening is not limited to the part of the drawin region which is formed by the delivery nozzles 7, 7" or the tubular section 14, but also extends inside the inlet portion 4" of casing 2", so that the gap required for the apparatus to operate efficiently with highly viscous media extends along the whole length of the drawin region between screw flights 10" and the inner wall of the drawin region. The screw flight 10" inside inlet portion 4" is made still flatter, giving a relatively large gap extending to the delivery region.

Figure 8:
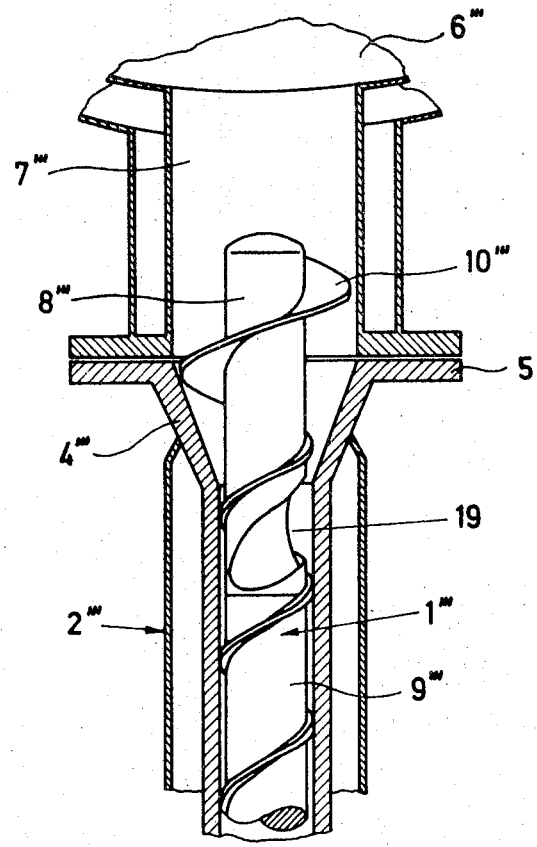
FIG. 8 is a longitudinal section view of a drawin region comprising a screw whose webs are reduced in size on two opposite sides.
Figure 9:
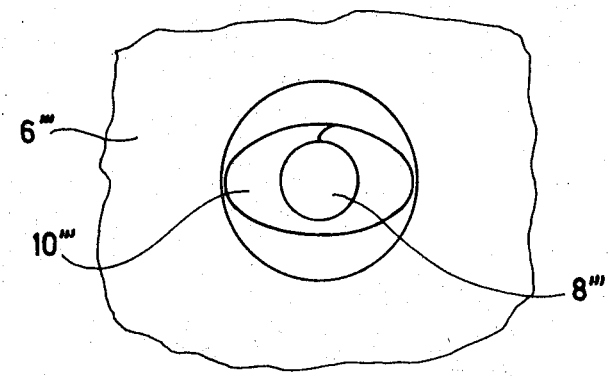
FIG. 9 is a plan view of the apparatus in FIG. 8.

In FIGS. 8 and 9, screw flights 10" are flattened on two opposite sides of screw section 8''', to form two gaps (see FIG. 9). Casing 2''', inlet portion 4''' and delivery nozzle 7''' have walls which are round in cross section. In the transition region from the drawin region to the delivery region, the core of screw 1''' has a recess 19 which further improves the mixing and conveying effect. Recess 19 is groove-shaped and extends approximately once around the screw core. The flattening of screw flights 10''' extends to the inlet portion 4''' so that the gaps on opposite sides extend to the delivery region.

The embodiments in the FIGS. 6—9 can easily be manufactured by converting existing apparatus, thus improving their drawin capacity and ventilation.

Figure 10:
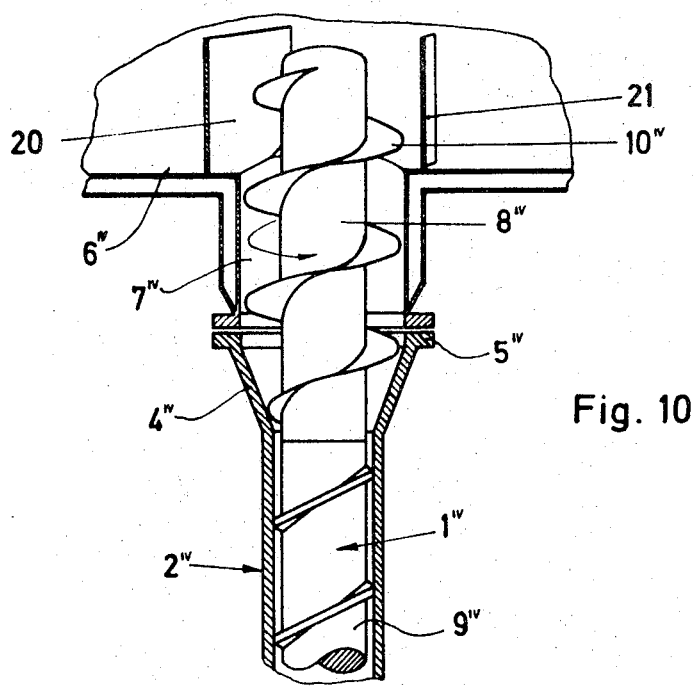
FIG. 10 is a section view of a drawin region comprising a screw projecting into a reservoir.
Figure 11:
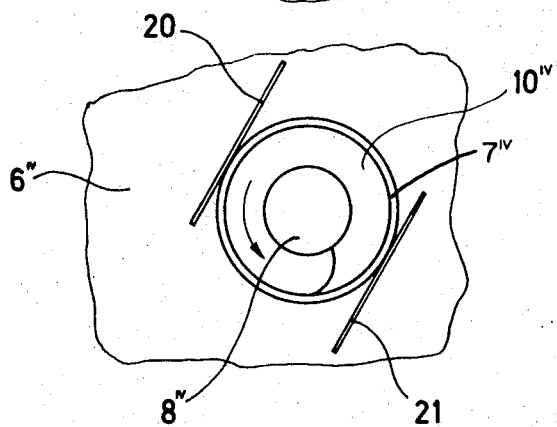
FIG. 11 is a plan view of the apparatus in FIG. 10.

Another method of improving the drawin capacity and ventilation of existing apparatus is shown in FIGS. 10 and 11. In FIGS. 10 and 11, screw 1'''' has a drawin screw 8'''' extending into the reservoir 6''''. Reservoir 6'''' contains two parallel walls 20 and 21 near the drawin screw 8''''. Walls 20 and 21 are slightly displaced with reference to one another (see FIG. 11) against the direction of rotation of screw 1''''. Screw 1'''', inlet portion 4'''' and outlet nozzle 7'''' are consistently circular. The gaps, required for ventilation and for drawing in the medium, are formed in this embodiment between screw flights 10'''' and the sidewalls of reservoir 6'''', which extend upwards.

FIGS. 12 to 16 show various embodiments of drawin regions in cross section ensuring good ventilation and efficient drawing in of highly viscous media. In all the embodiments, the gap or gaps between the screw flights 10 and the wall 22 of the drawin region are approximately crescent-shaped. Each of the drawin regions in FIGS. 12 to 14 has a screw and two gaps. The drawin region in FIG. 15 has three gaps. FIG. 16 shows a drawin region of a conveyor with two screws. The arrows show the direction of rotation of the screw.

The screw conveyor according to the invention can convey media of viscosity up to 60,000 poises from vacuum reservoirs without interrupting the flow of material. Media of even greater viscosity can easily be conveyed by the apparatus of the invention. Any gas bubbles can easily escape from the drawin region, and the upper screw flights allow the conveyed medium to come in from the side. In the lower end of the drawin region, preferably inside the widened inlet part of the conveyor, the gap between the flights and the wall of the drawin region is either completely blocked or reduced until a considerable pressure is exerted on the medium, which is pressed into the delivery part of the apparatus.

The screw conveyor of the invention is extremely useful in the production of synthetic polymeric shaped objects, particularly fibers. In extruding molten polymers, frequently difficulty is caused by bubble formation in the melt due to the presence of volatile material. The screw conveyor of the invention permits the venting of such bubbles of volatile material prior to extrusion of the melt to thereby produce a uniformly high quality product.

The invention has been described in detail with reference to particular and preferred embodiments thereof, but it will be understood that variations and modifications can be made within the spirit and scope of the invention as described hereinabove and as defined in the appended claims.

We claim:

1. A screw conveyor for conveying highly viscous material which comprises at least one screw in a housing; said housing having inner walls defining an inlet region, a drawin region communicating with said inlet region, and a pressure region of substantially constant cross-sectional area and communicating with said drawin region, said inlet region having a cross-sectional area larger than said area of said pressure region; said screw comprising a shaft of substantially uniform diameter and a helical spiral web attached to the surface of the shaft, said spiral web being of substantially uniform width in said pressure region but being of a greater width in said drawin region; the cross-sectional configuration of the housing, the shaft, and the web in at least a portion of said drawin region is adapted to provide, as the screw rotates, a variation in space, from slight clearance to a gap, between the periphery of the inner wall of the housing and the screw webs and shaft, and to cooperate to alternately compress and release from pressure the material being conveyed, thereby venting gases from said material.

2. A screw conveyor according to claim 1 wherein said gap has a crescent shaped cross-sectional configuration.

3. A screw conveyor according to claim 1 wherein the cross-sectional area of said gap decreases continuously in a direction away from said inlet region.

4. A screw conveyor according to claim 1 wherein the cross-sectional area of said drawin region increases in the direction towards said inlet region.

5. A screw conveyor according to claim 1 wherein there are a plurality of gaps symmetrically disposed with respect to the axis of said shaft.

6. A screw conveyor according to claim 1 wherein said drawin region has an elliptical cross-sectional configuration.

7. A screw conveyor according to claim 1 wherein said screw extends into a reservoir for said viscous material communicating with said inlet region.

8. A screw conveyor according to claim 1 further comprising means for heating said housing.

9. A screw conveyor according to claim 1 wherein said drawin region has an elliptical cross-sectional configuration and wherein there are 2 crescent shaped gaps symmetrically positioned at the ends of the major axis of said ellipse.

10. A screw conveyor according to claim 1 wherein said shaft has a groove thereon, said groove communicating with said drawin region and said pressure region.

11. A screw conveyor according to claim 1 wherein said drawin region has a circular cross-sectional configuration and said screw has an elliptical cross sectional configuration.